Jan. 20, 1953 J. OPIE 2,625,903
SUGAR SANDING MACHINE FOR CONFECTIONS AND THE LIKE
Filed Nov. 22, 1950 3 Sheets-Sheet 1
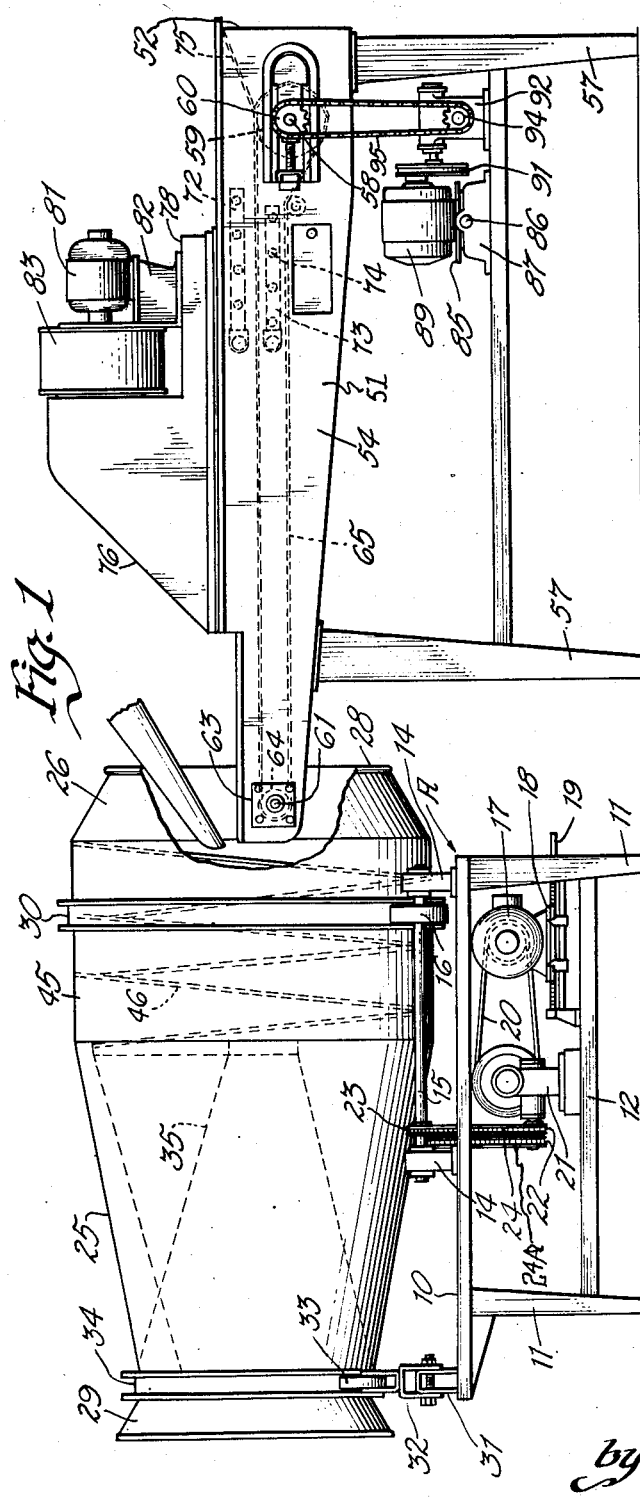
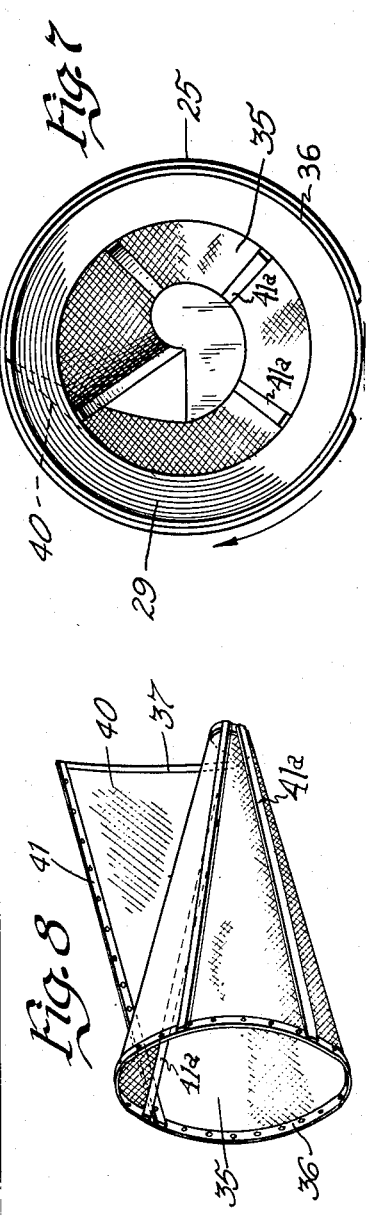
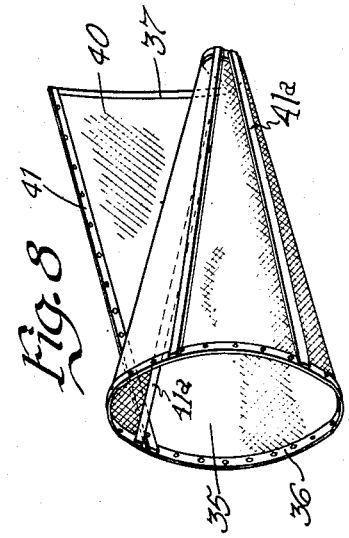
Inventor
John Opie
by John F Brezina
Attorney

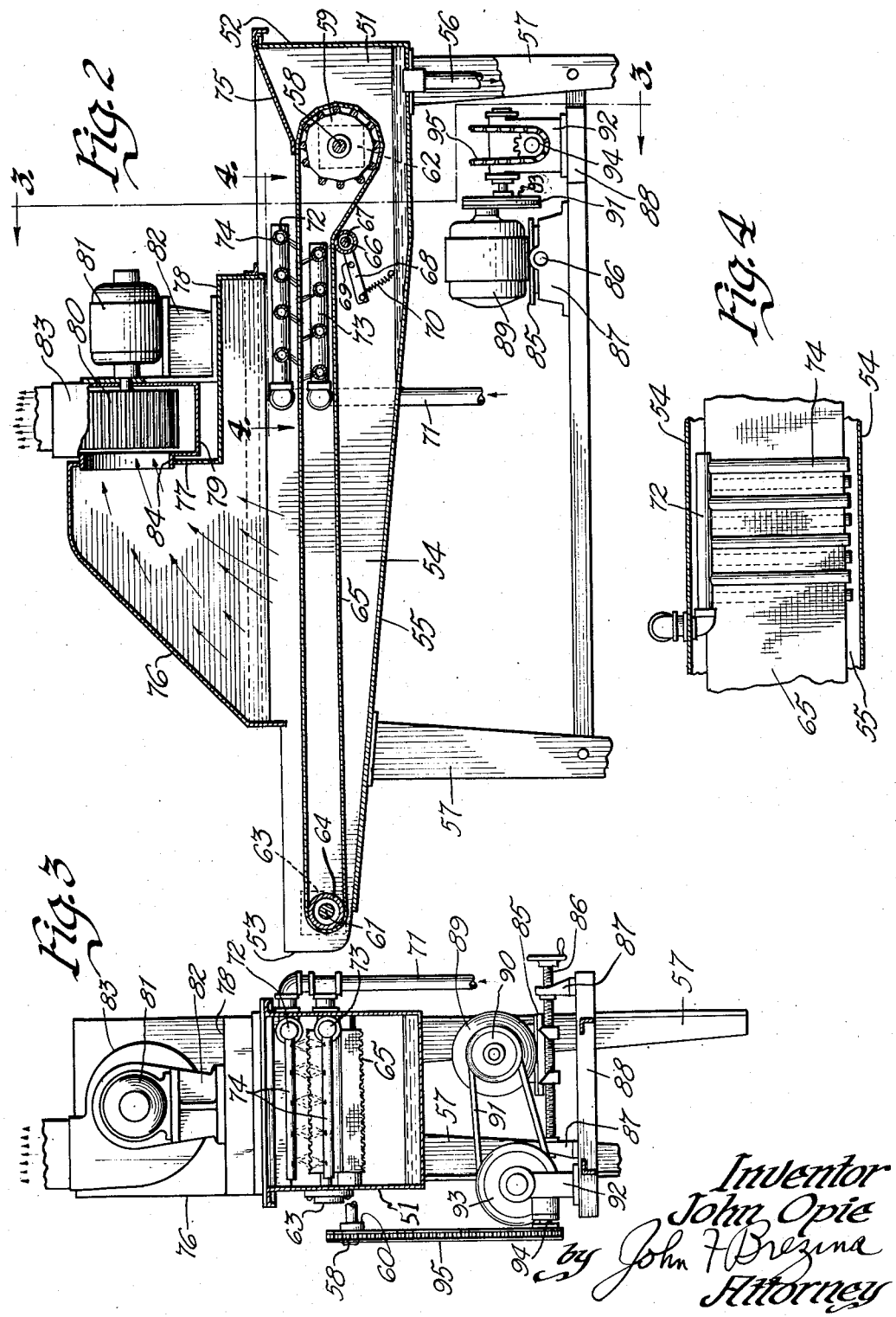

Jan. 20, 1953 J. OPIE 2,625,903
SUGAR SANDING MACHINE FOR CONFECTIONS AND THE LIKE
Filed Nov. 22, 1950 3 Sheets-Sheet 3
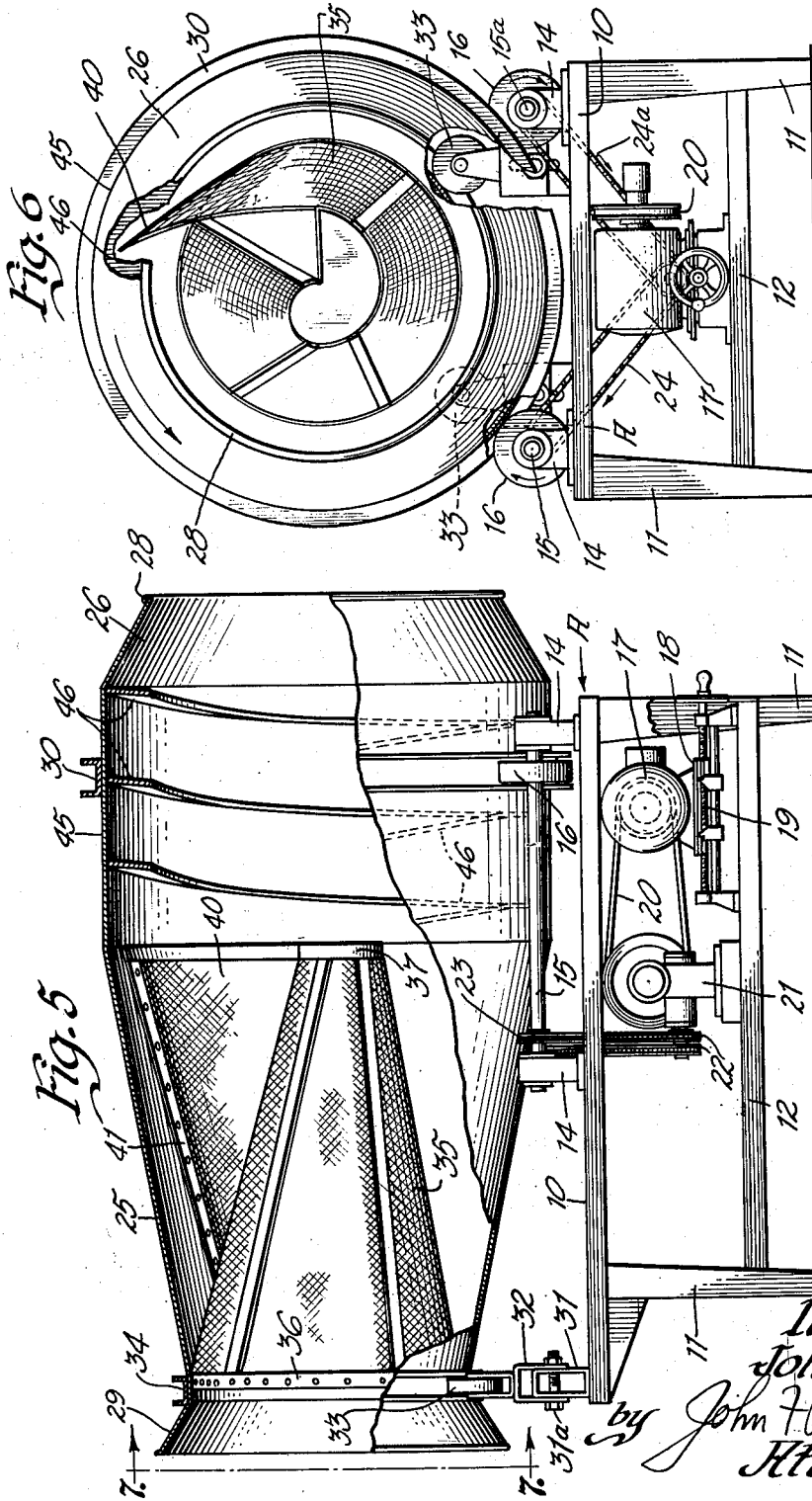
Inventor
John Opie
by John F. Brezina
Attorney Patented Jan. 20, 1953

2,625,903

UNITED STATES PATENT OFFICE 2,625,903

SUGAR SANDING MACHINE FOR CONFECTIONS AND THE LIKE

John Opie, Riverside, Ill.

Application November 22, 1950, Serial No. 196,966

4 Claims. (Cl. 118—19)

An important object of my invention is the provision of a novel sugar sanding machine having characteristics for selective continuous operation and which includes a rotatable selectively operable hopper and which includes a novel rotatably mounted cone-shaped screen and conveyor which will gradually pick up and feed pieces of candy or the like and deliver same to the outlet or exit end of a rotatably mounted hopper which is normally slowly rotated during operation by causing it to be continuously rolled or tumbled toward thru the outlet end, so that when candy or the like reaches the area of delivery and expulsion from the machine it will be substantially free of excess sugar.

A further object of my invention is the provision of a candy sander having the above features and which is removable and portable so that it may be easily moved from the machine for easy washing, cleaning and sterilizing, and which includes a driven conveyor which may be easily moved away from the rotatable hopper to permit easy selective access to the sander and its selective complete removal for cleaning and sterilizing, without any dismantling of structural or mechanical parts.

A further object and accomplishment of my invention is the provision of a compact and portable sugar sanding machine for confections which has manually controlled rotatable drum and hopper and a spiral pick-up conveyor means for picking up and moving the candy and a part of the sugar, and for tumbling and mixing such candy while its coating and surface is sticky to thereby cause portions of the agitated sugar to adhere to the candy to the desired amounts; and which device includes means for permitting the surplus unadhered sugar to be delivered into the bottom of the hopper for subsequent re-use; and which includes means for permitting the surplus to be removed; and which also includes manually adjustable means and mechanism for regulating the speeds of the conveying and the tumbling operations and the rotation and desired speed of delivery of the candy to the area of sugar application and to the points of expulsion.

A further object of my invention is the provision of a novel machine of the described class which has manually adjustable means and mechanism for regulating the speed of delivery and of expulsion of the confections into and from the machine, and which has mechanism for adjusting the incline and relative position of the outlet and delivery end portion of the hopper to thereby regulate the duration of time during which the candy is subjected to sugar application, and to thereby vary the amount of sugar to be applied to the candy; and which also has means for causing the surplus sugar, which has not adhered to the candy, to fall and be selectively delivered to an area for re-use.

Fig. 1 is an elevational view of my novel sugar sanding machine and looking at one side thereof.

Fig. 2 is a partially elevational and partially cross sectional view of the conveyor-containing portion of my sanding machine, and with parts in section.

Fig. 3 is a partial end view of said machine and taken substantially on line 3—3 of Fig. 2.

Fig. 4 is an enlarged partially cross sectional view taken on line 4—4 of Fig. 2 and showing a fragment of a conveyor in elevation and part of the adjacent steam ejecting means.

Fig. 5 is a partial cross sectional view with parts broken away showing the interior of the hopper and contained parts, and a part of the supporting means.

Fig. 6 is an end elevation of the hopper-containing portion of my machine.

Fig. 7 is a reduced elevational view looking at the end portion of the hopper and showing the spiral-like material engaging member.

Fig. 8 is a perspective view of the screen-like material engaging and tumbling member.

Referring to Fig. 1, letter A designates a portable table, frame or other suitable standard or support which has a flat top 10 having supporting legs 11, preferably four in number. A horizontal shelf 12 is connected to and is supported by said legs.

Two pairs of journalling boxes or pillow blocks 14 are secured to the table top 10 at substantially opposite side edges thereof, (as illustrated in Figs. 1 and 6). A pair of horizontally extending shafts 15 and 15a are journalled in said two pairs of journalling boxes 14 so that said shafts are substantially parallel. Each of said shafts has secured thereon and at substantially one end thereof a pulley or wheel 16, said wheels being in alignment with each other.

The means for selectively driving said shafts comprises an electric motor 17 which is adjustably mounted upon a slidably mounted support or platform 18 which said platform is movable toward or away from the speed reducer by a control screw 19, whereby the transmission belt 20 may be adjusted as desired.

Numeral 21 designates a conventional speed reducer which is securely mounted on shelf 12, and has a pair of external driven sprockets 22. A pair of sprockets 23 are secured on shafts 15 and 15a respectively, and one endless chain 24 drivingly connects one sprocket 22 to one of the sprockets 23 on shaft 15 and another chain 24A drivingly connects the second sprocket 22 to the other sprocket 23 on shaft 15a. It will be understood that by the aforesaid mechanism the power will be transmitted thru said chains 24 and 24A to drive shafts 15 and 15a and the pulleys 16 on said shafts, will be rotated in a common direction, (which is counterclockwise looking at Fig. 6). Said electric motor is suitably connected thru a switch controlled circuit (not shown) to a source of electric power.

Referring to Figs. 1, 5 and 6 numeral 25 designates a hopper or drum made of sheet metal (preferably of a non-rusting type) and the main portion thereof is of frusto-conical shape and with its larger end portion being the entrance or inlet for the products such as candy.

Numeral 45 designates a cylinder or substantially cylindrical screw conveyor which is disposed horizontally, and one of its ends is suitably secured, i. e. by welding, to a portion of the enlarged edge of the hopper 25.

The inlet end portion of the cylinder 45 has secured thereto by welding or the like the inwardly converging annular lip or flange 26 which defines a large inlet opening as indicated in Figs. 5 and 6. The end portion of cylinder 45 is secured by welding or the like to the larger annular edge of hopper 25.

An annular channel-like track 30 is secured by rivets, bolts or the like about the middle portion of cylinder 45, as illustrated in Figs. 1 and 5. Said track 30 removably rides on a pair of pulleys 16 which are secured on drive shafts 15 and 15a respectively.

An annular reinforcing bead, rib or flange 28 is preferably secured about the outer annular edge of said flange 26.

The opposite or outlet or discharge end portion of the hopper 25 carries an outwardly flaring beaded flange or annular apron 29 which is formed of sheet metal and suitably secured to the main portion of said hopper 25.

Suitably secured, for example by welding, to the inside annular face of the cylindrical wall of screw conveyor 45 is a spiral relatively narrow inwardly projecting flange or spiral baffle 46 which defines a spiral path within said conveyor 45 and in a direction so that the deposit into its inlet end portion of movable articles such as confections, will result in such articles being gradually moved to the oposite end and into the general area defined by the cone-shaped conveyor 35.

During rotation of the hopper and said conveyor said spiral flange will engage the articles to tumble same and gradually move same toward the discharge end of said hopper 25.

Referring to the left hand portion of Figs. 1 and 5 numerals 31 designate a pair of vertically adjustable supports, standards, or brackets whose lower end portions are suitably secured on the end portion of the top 10, only one of which is shown in Figs. 1 and 5. Secured on each of said adjustable supports 31 is a U-shaped journalling bracket 32 and a pair of wheels or pulleys are journalled in alignment with each other in said brackets respectively, and with the aid of pins or pintles, (not shown).

The reduced and discharge end portion of the hopper 25 has suitably secured thereon by welding or the like an annular channel-like guide track 34 of U-shaped cross section. Said guide track 34 removably rests and rides on the two spaced apart pulleys 33.

In the extending portions of brackets 31 and 32, elongated slots 32a are formed so that when each upper bracket 32 is superposed and positioned to saddle over the adjacent bracket 31 said slots will register respectively. Bolts 31a are releasably secured in each set of said registering slots 32a, this providing for varying the relative position of each upper bracket 32 and thereby adjustably mounting the pulleys 33 to in turn provide for adjusting the position of the outlet end portion of the hopper 25 to thereby adjustably vary the incline of the annular wall of said hopper 25. By lowering the brackets 32 and the incline of hopper 25 a more rapid travel and expulsion of confection pieces will be attained. This is an important advantage in some types of confections which are to be sugar sanded to either a greater or lesser degree than others.

It will be understood that the power driven rotation of shafts 15 and 15a will cause rotation of said hopper in the opposite direction and that said hopper will rotate evenly and without end-wise slippage because of the engagement of the flanges of the two annular tracks 30 and 34 with the aforesaid pulleys on which they ride. It will be further understood that said hopper may be quickly and easily lifted away and removed from its mounting and for the purpose of important cleaning and sterilization which may be performed at a remote point with the aid of hot water, steam, etc.

Referring to Figs. 5, 6, 7 and 8, numeral 35 designates a substantially cone-shaped conveyor, tumbler or mixer, a major part of which is of frusto-conical shape, and which is made of either perforated sheet metal or reinforced wire mesh or fabric. Conveyor 35 has optional annular reinforcing straps 36 and 37 secured by rivets, welding or the like to both its curved opposite ends, as illustrated in Fig. 8, for the purpose of imparting rigidity and stiffness to same.

Conveyor 35 has one edge portion thereof extended and projecting outwardly in a curved tangential plane to provide a scoop-like member 40, as shown in Figs. 7 and 8, said projecting member 40 being adapted to act as a scoop and pickup means for the confections.

A reinforcing strap 41 is preferably secured to the upper edge portion of said member 40 by rivets or the like, and longitudinal reinforcing strips 41a connect the opposite ends of said conveyor (see Figs. 7 and 8).

The enlarged end portion of conveyor 35 is suitably secured, for example by rivets, to the reduced end portion of the hopper 25, as partially illustrated in Fig. 5, so that said tumbler and conveyor 35 is held disposed co-axially with the longitudinal axis of said hopper.

The opposite edge portion of said conveyor 35, which is on the inside of the cone, is curved inwardly as illustrated in Figs. 6, 7 and 8, and is spaced substantially from the inner face of the projecting member 40 of said conveyor so that as the conveyor is rotated the confections will pass between such inner edge and said member and be moved and tumbled in a spiral path in said conveyor and with gradual movement of the confections toward the larger discharge end of said conveyor 35.

Referring to Figs. 1, 2 and 3, numeral 51 designates an elongated tank or receptacle of sheet metal and having opposite end walls 52 and 53 and opposite substantially parallel side walls 54, all suitably joined to be leak-proof at the corners, and providing a tunnel or chamber as hereinafter more fully described.

Said tank 51 has an inclined bottom wall 55, which provides a lower water basin or well at one end, as shown at the right of Fig. 3. A suitable discharge pipe 56 is securely mounted in an outlet opening formed in the bottom wall of said well to provide for the outflow of water formed by condensation of steam to a drain or the like. Said tank 51 is open upwardly except as hereinafter defined.

Said tank or receptacle (which comprises the main body portion of said machine) is suitably supported by four depending legs 57, only fragments of which are illustrated in Fig. 2.

A transversely extending shaft 58 is journalled at its ends in the bearing portions of a pair of opposed mounting plates or bearing brackets 62 adjacent the deeper end of said tank, one of which is illustrated in elevation in dotted line at the right of Fig. 3. Mounted on said shaft 58 and secured thereon is a roller 59 on which endless conveyor belt 65 is adapted to roll. A sprocket 60 illustrated in Fig. 3, is securely mounted on the outwardly projected end of shaft 58 which projects exteriorly of one side wall 54 of said tank 51 thru a suitable sealing bearing.

A second transverse shaft 61 is mounted parallel to shaft 58 and with its opposite ends suitably journalled in apertured bearing portions of mounting plates or brackets 63, one of which is illustrated in the left of Fig. 2, said mounting brackets 63 being suitably secured as by rivets to the opposite side walls 54 respectively of said tank.

A roller 64 is securely mounted on the shaft 61 as illustrated in Fig. 2. Shaft 61 is parallel to shaft 58. Said roller 64 is adapted to have the endless belt 65 mounted there-about so that said belt will travel on said rollers 64 and 59.

As shown in Fig. 2 an idler roller 66 is mounted on a stub shaft 67 which in turn has one end secured in a lever 68 which lever 68 is fulcrumed or pivoted on a fixed pivot 69 secured on one side wall of said tank. The opposite end of said lever 68 is normally held under tension by a spring 70 anchored to said tank, so that said belt 65 will be held reasonably tight.

Referring to Fig. 2, numeral 71 designates an angular steam inlet pipe or conduit which has an upper branch header 72 and a lower branch header 73, which headers are disposed substantially above and below the upper section of said conveyor belt 65 respectively. A plurality of relatively short nozzles or apertured jet pipes 74 have one end of each thereof secured by threading or the like in holes in said headers 72 and 73 respectively, and so that one set of said "jet" or spray nozzles 72 are disposed in a horizontal plane above belt 65 and the other set of said jet or spray nozzles 73 are below said belt 65 (see Fig. 4).

The outlet ports of said jet or spray nozzles 72 and 73 are disposed toward the belt 65 and preferably slightly in a forward direction, that is, toward the part of the tank toward which the confections are conveyed so that steam omitted therefrom will be directed away from the operator at the feeding or inlet end of said device.

Referring to Fig. 2, numeral 75 designates in cross section a removable apron, shield or baffle which has one end portion removably seated on the end wall 52 of the tank 51, and its inner end normally rests on the face of belt 65.

Said apron prevents any confections from falling into the tank when dumped thereon, that is, on the belt, and the fact that the belt is of such width as to substantially extend from one side wall to the other side wall of the tank prevents any confections from falling off said belt during travel thereon.

Referring to Figs. 2 and 3, numeral 76 designates a metal casing, cover or hood which is formed of sheet metal and which is removably mounted over the middle portion of the tank 51 and belt 65. Hood 76 has an apertured vertical wall 77 whose lower end is jointed to a horizontal wall section 78, as illustrated, which forms a base upon which is mounted a housing 79 of a driven rotatable blower 80.

An electric motor 81 is suitably supported on a bracket 82 which is secured on wall section 78. The projecting part of the shaft of said motor 81 has mounted thereon a conventional blower such as illustrated in Fig. 2. The blower housing 79 has an outlet conduit or pipe 83 which may extend to any remote point of exhaust and also has a flanged inlet 84 which is mounted in the outlet opening of the hood 76 whereby the surplus steam, vapor and air will be exhausted from the chamber within said hood 76 and from the area surrounding said conveyor belt 65.

The continuous exhausting of such steam is essential to prevent steam from entirely surrounding the area of the device and from making it impossible for workers to operate and feed said device.

Referring to Figs. 2 and 3, numeral 85 represents a motor mounting base adjustably mounted for horizontal movement with respect to and by means of a threaded rotatable screw 86 which is in turn journaled in a pair of spaced apart journaled blocks 87 secured on a lower horizontal shelf 88, shelf 88 being connected to and supported by legs 57. Screw 86 is in threaded engagement with depending extensions of said base as illustrated in Fig. 3.

An electric motor 89 is secured on base 85 and its shaft carries a pulley 90 which drives an endless belt 91. Numeral 92 designates an adjustable speed reducer whose driven pulley 93 is driven by endless belt 91. Secured on the projecting end portion of a stub shaft of speed reducer 92 is a sprocket 94.

An endless chain 95 drivingly connects sprocket 94 and sprocket 60 so that when said speed reducer is driven, the power will be transmitted through said chain 95 to shaft 58 to move endless belt 65 in counter-clockwise direction looking at Fig. 2. It will be understood that by said manually adjustable mechanism the speed of said conveyor belt may be varied to meet different requirements according to the length of time it is desired that the confections be subjected to steam to thereby soften their surfaces to the desired degree and to make the same tacky for the subsequent adhesion of sugar. This adjustability of time of subjection is important as different types of candies and confections require different durations of steam treatment, as in certain cases excessive softening of the candy coating will cause it to run, lose shape and appearance and to stick together.

I have found by repeated experimentation and tests with different types of candies and confections to which sugar is to be applied for commercial acceptance that my said adjustable and manually controllable sugar sanding machine is highly satisfactory for the different and varied types of candies and confections which varying types require different and varying amounts of sugar application or coating. It will be understood that by manually adjusting the speed of the rotating hopper and optionally by adjusting the height of the outlet end portion thereof, that the speed of travel and consequently the duration of subjection of confections to sugar application may be varied in a wide range by adjustment of the mechanism hereinbefore described. An important advantage also is that the speed of delivery of the confections by the described mechanism into the hopper may be adjusted and synchronized both as to the speed and duration of travel of the confections through said hopper and the conveyor means thereof and also to the duration that the confections are to be subjected to steam so as to vary as desired or required the degree of softness, stickiness and tackiness of the confections prior to their delivery into said hopper for sugar application. It will be understood that greater degree of softness and tackiness produced upon the confections will result in the adhesion of and impregnation of more sugar in instances where this is desired. At the same time, the aforedescribed adjustability of said mechanism permits the adjustment of the duration of steam subjection only to the degree desired so as to prevent excessive stickiness which would interfere with the movement of the confections through said hopper and which excessive stickiness would otherwise cause the candy particles to stick together when same contact each other.

As many changes could be made in the above construction, and as many apparently widely different embodiments of my invention within the scope of the claims could be constructed without departing from the spirit and scope thereof, it is intended that all matter contained in the accompanying specification shall be interpreted as illustrative and not in a limiting sense.

I claim:

1. A sugar sanding machine for confections having a supporting frame; a pair of drivable parallel shafts journalled in said frame; pulleys on said shafts in alignment with each other; a second pair of aligned pulleys supported on the opposite end of said frame; a horizontally extending open ended hopper, having an intermediate cylindrical chamber and an adjacent frusto-conical chamber terminating in an enlarged intake opening, a pair of channel-like annular tracks secured to and surrounding said hopper, said tracks being proximate to the opposite ends thereof respectively; said tracks engaging said pairs of pulleys respectively, and an inwardly extending spiral flange mounted on the cylindrical chamber walls, a perforated spiral conveyor mounted in said hopper and having one end connected to the outlet end of said hopper and extending to the central area of said hopper; said spiral conveyor having a curved tangentially extending portion extending substantially to the inner wall of frusto-conical portion of said hopper and adapted to pick up and tumble confections and to thereby cause portions of the sugar to contact and adhere to said confections and said spiral conveyor being adapted to deliver said confections to and through the outlet opening of said hopper.

2. In a machine for selectively applying sugar to confections having sticky surfaces; a rotatably mounted horizontally extending portable annular hopper having an enlarged inlet opening at one end and a discharge opening at its other end; annular tracks surrounding said hopper; a frame, spaced apart rollers on said frame and engaging said tracks; a mechanism for selectively driving said rollers to rotate said hopper; an agitator of substantially cone-shaped spiral form secured longitudinally in said hopper and having its larger end connected to the discharge end of said hopper and rotatable therewith, said agitator extending inwardly to substantially the central area of said hopper, said agitator having a plurality of openings therein and having a curved projecting edge portion extending to the wall of said edge portion being adapted to pick up confections and said hopper; said agitator being adapted to roll and tumble confections and sugar fed into said hopper and to gradually move the confections to the discharge opening of said hopper.

3. A sugar sanding machine for confections or the like having a supporting frame; a pair of spaced apart pulleys and shafts supported on said frame; a second pair of pulleys supported at the opposite end portion of said frame; an elongated annular hopper having relatively large inlet and outlet end openings; an inwardly extending spiral flange secured to the walls of one portion of said hopper; a substantially conical tumbler and conveyor mounted in the other portion of said hopper and having a curved tangential perforated scoop portion, the rotation of said hopper being adapted to cause said spiral flange to engage and gradually move confections inward of said hopper to areas wherein said scoop-bearing conveyor will pick up said confections and rotate, tumble and move the same to and through the outlet opening of said hopper, said hopper being removable from engagement with said pulleys to permit easy cleaning thereof; vertically adjustable means for supporting the pulleys adjacent the outlet end of said hopper whereby the incline of said hopper may be adjusted to vary the speed of travel of confections through said hopper, said hopper being adapted to have sugar delivered into its inlet end portion.

4. In a machine for selectively applying sugar to confections having sticky surfaces; a rotatable mounted horizontally extending portable annular hopper having an enlarged inlet opening and a discharge opening; annular tracks surrounding said hopper; a frame, spaced apart rollers on said frame and engaging said tracks; a mechanism for selectively driving said rollers to rotate said hopper; said hopper being mounted on said rollers; a spiral flange mounted in and connected to one end portion of said hopper and having its open end coinciding with the discharge opening of said hopper; apertured agitating and tumbling conveyor members mounted in said hopper adapted to mix and intermingle candy pieces and sugar and to thereby cause portions of the sugar to adhere to the pieces; said agitating and conveyor members including a substantially conical apertured tumbler in the central portion of said hopper and a curved scoop extending from said conical tumbler toward the wall of said tumbler; said scoop being adapted to pick up and gradually feed said pieces to and through the discharge openings of said hopper.

JOHN OPIE.

REFERENCES CITED

The following references are of record in the file of this patent:

UNITED STATES PATENTS

| Number | Name | Date |
|---|---|---|
| 1,063,029 | Haythornthwaite | May 27, 1913 |
| 1,840,289 | Hunter | Jan. 5, 1932 |
| 1,910,536 | Guggenheim | May 23, 1933 |
| 2,377,964 | Ransohoff | June 12, 1945 |